(12) United States Patent
Gilbertson et al.

(10) Patent No.: US 12,441,275 B2
(45) Date of Patent: Oct. 14, 2025

(54) CLEANING FOR ROTATING SENSORS (71) Applicant: Waymo LLC, Mountain View, CA (US)

(72) Inventors: Seth Gilbertson, Dublin, CA (US); Stephan Heinrich, Mountain View, CA (US); Michael Hall-Snyder, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 645 days.

(21) Appl. No.: 16/950,968

(22) Filed: Nov. 18, 2020

(65) Prior Publication Data

US 2022/0063568 A1    Mar. 3, 2022

Related U.S. Application Data

(60) Provisional application No. 63/071,629, filed on Aug. 28, 2020.

(51) Int. Cl.
*B60S 1/56* (2006.01)
*B08B 3/10* (2006.01)
*B08B 5/02* (2006.01)
*B60S 1/52* (2006.01)
*B60S 1/54* (2006.01)
(Continued)

(52) U.S. Cl.
CPC .................. *B60S 1/56* (2013.01); *B08B 3/10* (2013.01); *B08B 5/02* (2013.01); *B60S 1/52* (2013.01); *B60S 1/54* (2013.01); *G01S 7/4004* (2013.01); *G01S 13/931* (2013.01); *G01S 7/4043* (2021.05); *G01S 2013/93273* (2020.01)

(58) Field of Classification Search
CPC ...... B60S 1/56; B60S 1/52; B60S 1/54; B60S 1/481; B08B 3/10; B08B 5/02; B08B 3/02; G01S 7/4004; G01S 13/931; G01S 7/4043; G01S 2013/93273; G01S 2007/4977; G01S 7/4813; G01S 17/931; G01S 2013/9323; G01S 2013/9324; G01S 2015/937; G02B 27/0006
See application file for complete search history.

(56) References Cited

U.S. PATENT DOCUMENTS 6,554,210 B2    4/2003    Holt et al.
9,539,988 B2    1/2017    Hsiao et al.
(Continued)

FOREIGN PATENT DOCUMENTS

CN          110481510       * 11/2019

*Primary Examiner* — Alexander Markoff
(74) *Attorney, Agent, or Firm* — Botos Churchill IP Law (57) ABSTRACT

Aspects of the disclosure relate to cleaning rotating sensors having a sensor housing with a sensor input surface. For instance, a first signal from a position sensor indicating a current position of the sensor housing may be received. A second signal to activate a liquid nozzle and an air nozzle, the liquid nozzle being configured to provide a spray of liquid and the air nozzle being configured to provide a puff of gas may be received. When to activate the liquid nozzle in order to provide the spray of liquid on the sensor input surface may be determined based on the current position of the sensor housing and the second signal. When to activate the air nozzle in order to provide the puff of gas on the sensor input surface may be determined based on the current position of the sensor housing and the second signal.

20 Claims, 6 Drawing Sheets

(51) Int. Cl.
  *G01S 7/40*     (2006.01)
  *G01S 13/931*   (2020.01)

(56) References Cited

U.S. PATENT DOCUMENTS

| | | | |
|---|---|---|---|
| 10,286,877 B2 | 5/2019 | Lopez Galera et al. | |
| 2018/0015908 A1* | 1/2018 | Rice | B60S 1/56 |
| 2018/0265048 A1* | 9/2018 | Schmidt | B08B 5/02 |
| 2019/0016306 A1* | 1/2019 | Krishnan | G05D 1/024 |
| 2019/0106085 A1* | 4/2019 | Bacchus | G02B 27/0006 |
| 2019/0135239 A1* | 5/2019 | Rice | B60S 1/52 |
| 2019/0193688 A1* | 6/2019 | Lombrozo | B60S 1/54 |
| 2019/0275991 A1* | 9/2019 | Schmidt | B60S 1/56 |
| 2019/0299939 A1 | 10/2019 | Davies et al. | |
| 2019/0351464 A1* | 11/2019 | Kim | B08B 3/02 |
| 2020/0108802 A1* | 4/2020 | Jung | B60S 1/0405 |
| 2020/0130652 A1* | 4/2020 | Richardson | B08B 5/02 |
| 2020/0159010 A1* | 5/2020 | Kuwae | B08B 1/006 |
| 2020/0180563 A1* | 6/2020 | Gilbertson | B05B 9/0423 |

* cited by examiner

CLEANING FOR ROTATING SENSORS

CROSS REFERENCE TO RELATED APPLICATIONS

This application claims the benefit of the filing date of U.S. Provisional Patent Application No. 63/071,629 filed Aug. 28, 2020, the disclosure of which is hereby incorporated herein by reference.

BACKGROUND

Various types of vehicles, such as cars, trucks, motorcycles, busses, boats, airplanes, helicopters, lawn mowers, recreational vehicles, amusement park vehicles, farm equipment, construction equipment, trams, golf carts, trains, trolleys, etc., may be equipped with various types of sensors in order to detect objects in the vehicle's environment. For example, vehicles, such as autonomous vehicles, may include such LIDAR, radar, sonar, camera, or other such imaging sensors that scan and record data from the vehicle's environment. Sensor data from one or more of these sensors may be used to detect objects and their respective characteristics (position, shape, heading, speed, etc.).

However, these vehicles are often subjected to environmental elements such as rain, snow, dirt, etc., which can cause a buildup of debris and contaminants on these sensors. Typically, the sensors include a housing to protect the internal sensor components of the sensors from the debris and contaminants, but over time, the housing itself may become dirty. As such, the functions of the sensor components may be impeded as signals transmitted and received by the internal sensor components are blocked by the debris and contaminants.

BRIEF SUMMARY

One aspect of the disclosure provides system for cleaning a sensor, the sensor including a rotating sensor housing with a sensor input surface. The system includes a liquid nozzle configured to provide a spray of liquid, an air nozzle configured to provide a puff of gas, and one or more processors. The one or more processors are configured to receive a first signal from a position sensor indicating a current position of the sensor housing; receive a second signal to activate the liquid nozzle and the air nozzle; determine when to activate the liquid nozzle in order to provide the spray of liquid on the sensor input surface based on the current position of the sensor housing and the second signal; and determine when to activate the air nozzle in order to provide the puff of gas on the sensor input surface based on the current position of the sensor housing and the second signal.

In one example, the system also includes a vehicle and the sensor, and the sensor is mounted on the vehicle. In this example, the liquid nozzle and the air nozzle are positioned between the sensor housing and a rear of the vehicle. In another example, the second signal indicates that the sensor input surface requires cleaning. In another example, the second signal indicates a number of rotations of the sensor housing between when the liquid nozzle is to be activated and when the air nozzle is to be activated. In another example, the second signal further indicates a portion of the sensor input surface to be cleaned, and wherein determining when to activate the liquid nozzle is further based on the portion. In another example, the second signal further indicates a portion of the sensor input surface to be cleaned, and wherein determining when to activate the air nozzle is further based on the portion. In another example, the one or more processors are further configured to: activate the liquid nozzle further based on the determination of when to activate the liquid nozzle and activate the air nozzle further based on the determination of when to activate the air nozzle. In another example, the system also includes memory storing a table, and the one or more processors are further configured to determine when to activate the liquid nozzle using the table. In this example, the table identifies different timing combinations for activating the liquid nozzle and the air nozzle based on a portion of the sensor input surface to be cleaned.

Another aspect of the disclosure provides a method for cleaning a sensor. The sensor including a rotating sensor housing with a sensor input surface. The method includes receiving a first signal from a position sensor indicating a current position of the sensor housing; receiving, by the one or more processors, a second signal to activate a liquid nozzle and an air nozzle, the liquid nozzle being configured to provide a spray of liquid and the air nozzle being configured to provide a puff of gas; determining, by the one or more processors, when to activate the liquid nozzle in order to provide the spray of liquid on the sensor input surface based on the current position of the sensor housing and the second signal; and determining, by the one or more processors, when to activate the air nozzle in order to provide the puff of gas on the sensor input surface based on the current position of the sensor housing and the second signal.

In one example, the second signal indicates that the sensor input surface requires cleaning. In another example, the second signal indicates a number of rotations of the sensor housing between when the liquid nozzle is to be activated and when the air nozzle is to be activated. In another example, the second signal further indicates a portion of the sensor input surface to be cleaned, and determining when to activate the liquid nozzle is further based on the portion. In this example, the second signal further indicates a portion of the sensor input surface to be cleaned, and wherein determining when to activate the air nozzle is further based on the portion. In another example, the method also includes, activating the liquid nozzle further based on the determination of when to activate the liquid nozzle and activating the air nozzle further based on the determination of when to activate the air nozzle. In another example, determining when to activate the liquid nozzle includes using a table. In this example, the table identifies different timing combinations for activating the liquid nozzle and the air nozzle based on a portion of the sensor input surface to be cleaned.

DETAILED DESCRIPTION

Overview

The technology relates to a cleaning system for a rotating sensor mounted on a vehicle, such as an autonomous vehicle. The sensor may be a LIDAR, radar, sonar, camera, or other such imaging sensors that scan and record data from the vehicle's environment. The sensor may include a sensor housing which rotates relative to the vehicle. The sensor housing may house the internal components of the sensor and may include a sensor input surface through which signals may be sent and received. If the sensor input surface becomes partially or completely occluded by foreign object debris, such as water, dirt, etc., the sensor's ability to detect and identify objects in the vehicle's environment may become degraded. Because detecting and identifying objects is a critical function for an autonomous vehicle, clearing such foreign object debris can also become critically important.

The sensor may be arranged on a vehicle. The sensor housing and the sensor input surface may rotate. In order to clean the sensor input surface, the cleaning system may include a liquid nozzle as well as an air nozzle. The liquid nozzle may be connected to a reservoir storing a liquid cleaning fluid, such as water, alcohol, or various other liquid cleaning fluids. A liquid pump may be configured to pump liquid cleaning fluid from the reservoir through a liquid valve and out of the liquid nozzle in order to clean the sensor input surface. The rotation of the sensor housing may help to clear the liquid cleaning fluid from the sensor input surface.

However, the rotation may not be enough to ensure that the liquid cleaning fluid is fully removed from the sensor input surface. As such, the air nozzle may generate a puff (or jet or blast) of fluid, such as air or another gas, in order to force the liquid cleaning fluid off of the sensor input surface. An air pump may be configured to pump air through an air valve out of the air nozzle.

A controller may include one or more computing devices configured to receive, and act upon, various signals. For example, the controller may be configured to receive feedback from a position sensor identifying the position of the sensor. From this information as well as the rotation speed of the sensor housing, the controller may determine the current position of the sensor input surface at any given point in time.

The controller may also receive signals from the sensor and/or other computing devices of the vehicle indicating the current state of the sensor. For example, the controller may receive a signal indicating that the sensor input surface is occluded or dirty. This information may be generated by another system configured to determine whether the sensor input surface is dirty. In response, the controller may use the current position of the sensor input surface to determine exactly when to activate the liquid pump and the air pump as well as to open the air and liquid valves in order to both apply liquid cleaning fluid to the sensor input surface as well as to clear the liquid cleaning fluid from the sensor input surface using a puff of gas.

The features described herein may provide for a useful and practical approach to cleaning rotating sensors. In addition, the aforementioned timing, cleaning of different portions of the sensor input surface depending on where the sensor input surface is dirty, and the positioning of the nozzles may significantly reduce the amount of liquid cleaning fluid that would be wasted, for instance due to overspray, without such features. In addition, by reducing overspray, this avoids spraying onto other nearby vehicles or persons (specially in urban areas) and also reduces operational costs (as less fluid is wasted, less fluid may be needed). All of these can be important considerations when a vehicle is driving through an area where frequent cleaning is required as the amount of liquid cleaning fluid is limited to that which is in the reservoir.

Example Systems

Figure 1:
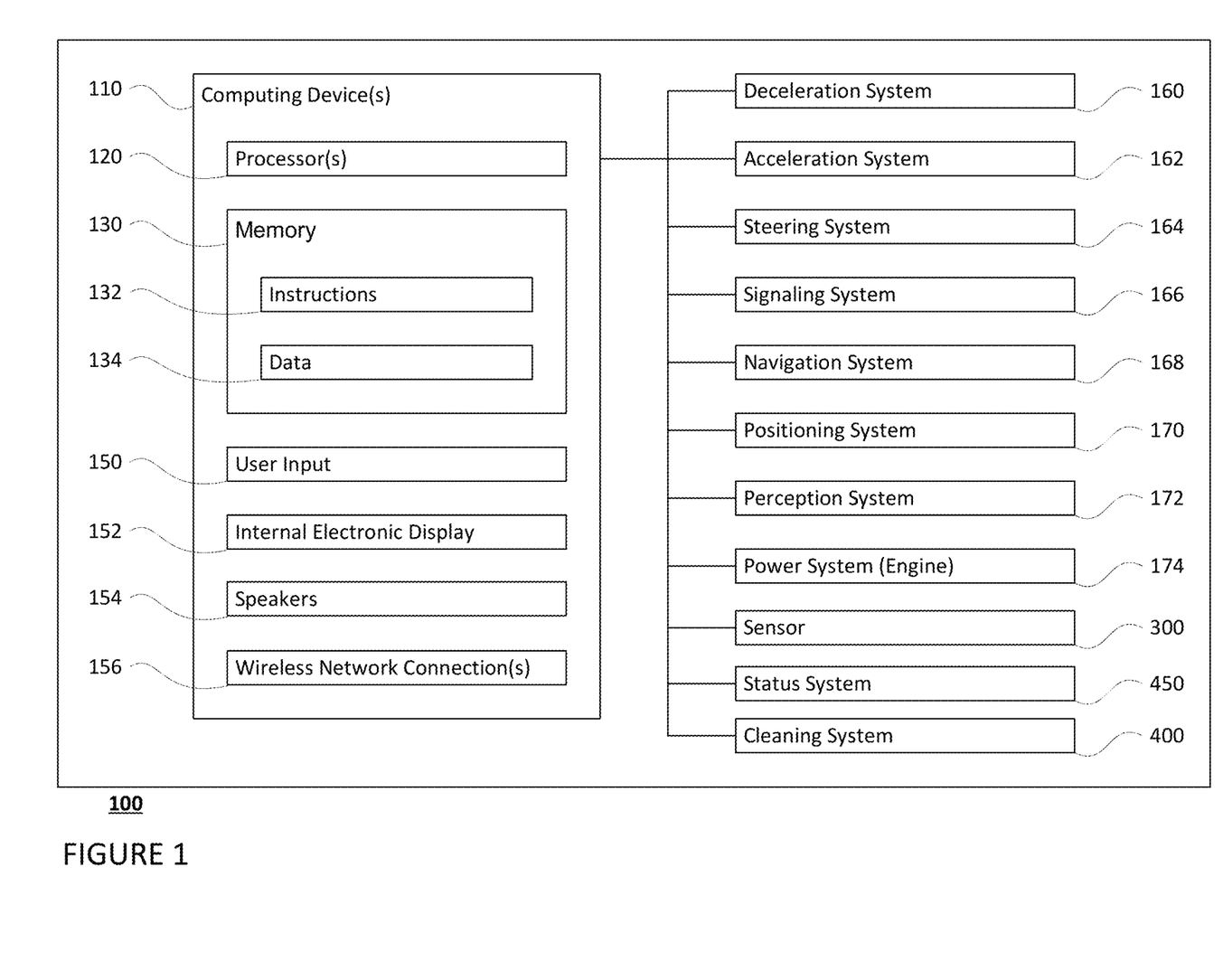
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having a heading that is oriented at an angle that is 20 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor.

Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing device 110 to provide information to passengers within the vehicle 100. The vehicle may also include one or more wireless network connections 156 to facilitate communicates with devices remote from the vehicle and/or between various systems of the vehicle.

In one example, computing device 110 may be an autonomous driving computing system incorporated into vehicle 100. The autonomous driving computing system may be capable of communicating with various components and systems of the vehicle, for instance, wirelessly (via wireless network connections 156) and/or a wired connection (such as a controller area network bus or other communication bus). For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. The vehicle 100 may also include a cleaning system 400 and a sensor status system 450 discussed further below.

Again, although these systems are shown as external to computing device 110, in actuality, these systems may also be incorporated into computing device 110, again as an autonomous driving computing system for controlling vehicle 100. In addition or alternatively, each of these systems may include one or more computing devices having processors and memory, configured the same as or similarly to processors 120 and memory 130 of computing devices 110 in order to enable the functionalities of these systems as described here.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle 100. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

As an example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, speed, acceleration, rate of change of acceleration, deceleration, rate of change of deceleration, etc. The raw data from the sensors and/or the aforementioned characteristics can be quantified or arranged into a descriptive function, vector, and or bounding box and sent for further processing to the computing devices 110 periodically and continuously as it is generated by the perception system 172.

Figure 2:
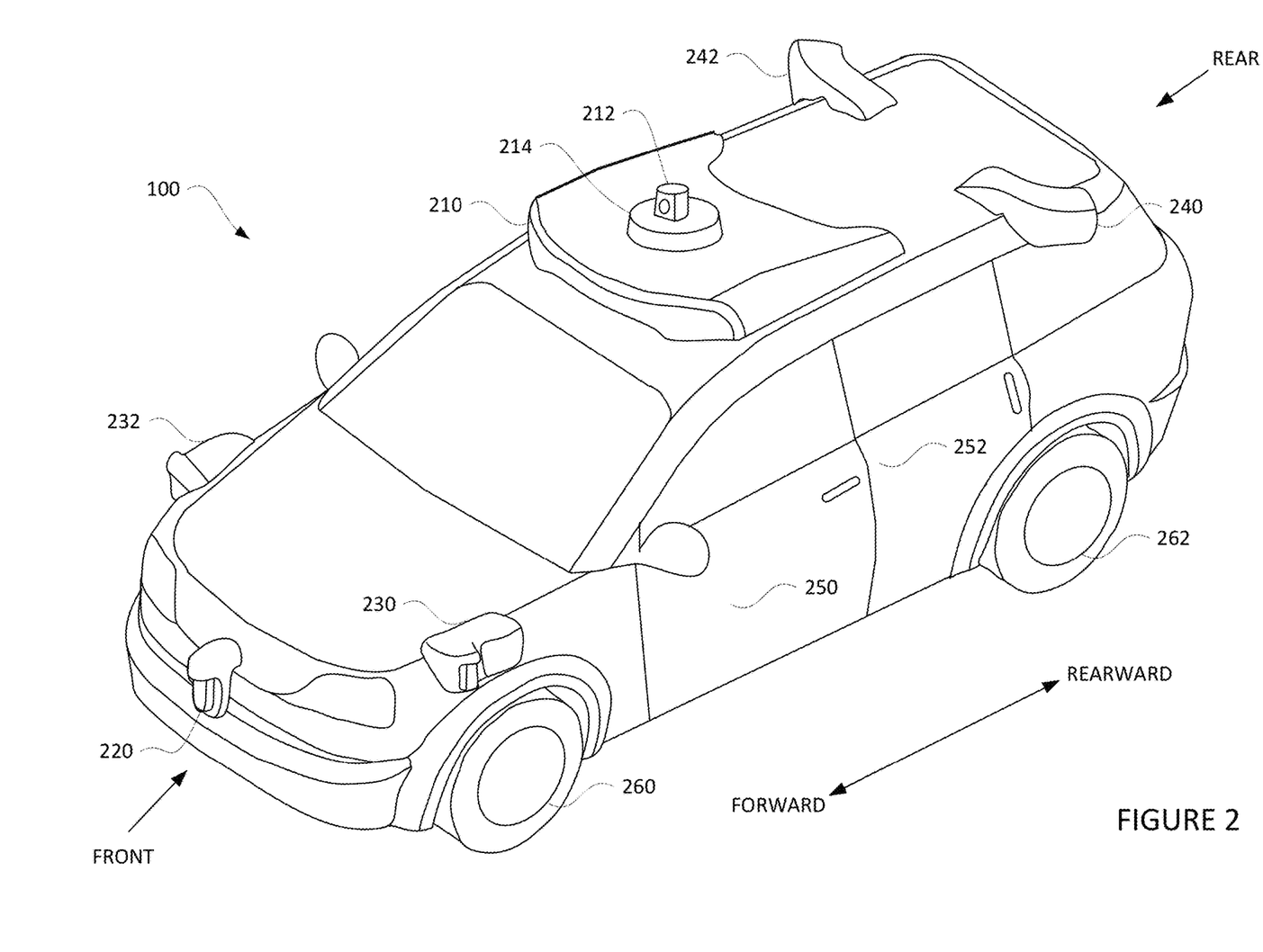
FIG. 2 is an example external view of a vehicle in accordance with aspects of the disclosure.

For instance, FIG. 2 is an example external view of vehicle 100. In this example, roof-top housing 210 and housings 212, 214 may include a LIDAR sensor as well as various cameras and radar units. In addition, housing 220 located at the front end of vehicle 100 and housings 230, 232 on the driver's and passenger's sides of the vehicle may each store a LIDAR sensor. For example, housing 230 is located in front of driver door 250. Vehicle 100 also includes housings 240, 242 for radar units and/or cameras also located on the roof of vehicle 100. Additional radar units and cameras may be located at the front and rear ends of vehicle 100 and/or on other positions along the roof or housing 210. In addition, Vehicle 100 also includes many features of a typical passenger vehicle such as doors 250, 252, wheels 260, 262, etc.

Example Sensor

Figure 3:
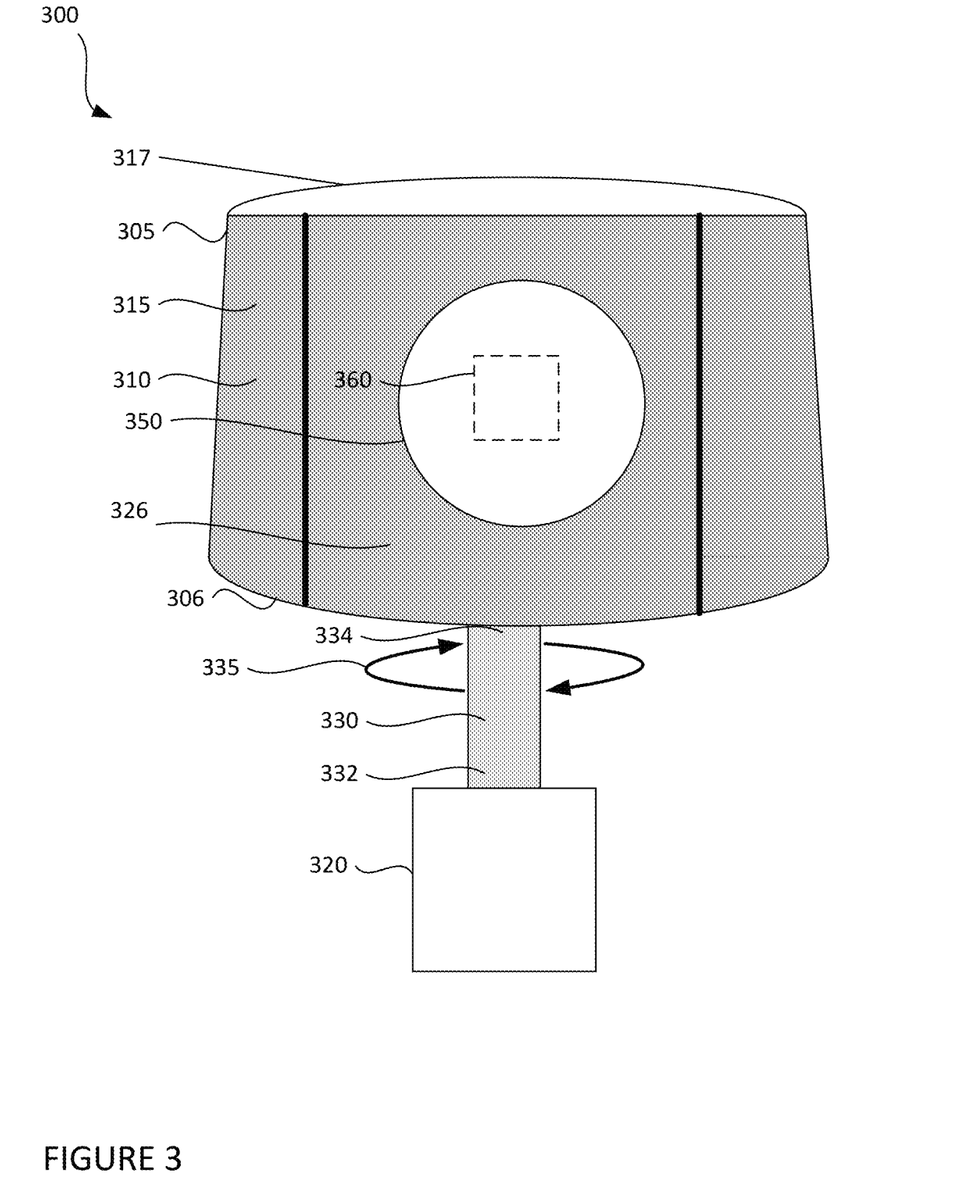
FIG. 3 is an example view of a sensor in accordance with aspects of the disclosure.

FIG. 3 depicts an example view of a sensor 300. The sensor may be arranged or mounted at various locations on the vehicle, including, for example, a top portion of the vehicle such as with housing 210 or at various other locations, such as the sides, front or rear of the vehicle. The sensor 300 may be incorporated into the aforementioned perception system and/or may be configured to receive commands from the computing devices 110, for instance via a wired or wireless connection.

The sensor 300 may include a housing 310 to protect the internal sensor components 360 (shown in dashed-line in FIG. 3 as they are internal to the housing 310) from debris such as water, dirt, insects, and other contaminants. However, over time, the housing and other sensor components may collect debris. As such, the functions of internal sensor components 360 may be impeded as signals transmitted and received by the internal sensor components may be blocked by the debris. To address this, debris may be cleared from the sensor 300 by rotating the internal sensor components 360 within the housing. This rotation may enable one or more wipers to clear any debris on a sensor input surface of the sensor.

The housing 310 may be configured in various shapes and sizes. As shown in the example of FIG. 3, the housing 310 is may be configured such that it has a domed shaped top portion 317 with a side wall 305, such that the housing is in the shape of a frustum. Although the sensor housing is shown in the shape of a frustum, the sensor housing may be configured in various shapes and sizes, such as spheres, cylinders, cuboids, cones, prisms, pyramids, cubes, etc., or any combination of such shapes. The sensor housing 310 may be comprised of materials such as plastic, glass, polycarbonate, polystyrene, acrylic, polyester, etc. For instance, the sensor housing may be a metal or plastic housing and the internal sensor components 360 have a "window" or sensor input surface 350 that allows the sensor to transmit and/or receive signals.

The sensor input surface may be arranged on or in the sensor housing such that the internal sensor components may transmit and receive one or more signals through the sensor input surface. For instance, the side wall 305 of the sensor housing 310 may include a flat portion 326 in which sensor input surface 350 is incorporated to allow signals (not shown) from internal sensor components 360 to penetrate the sensor cover 315, as further shown in FIG. 3. As an example, if the sensor housing is approximately 277 millimeters in diameter, the sensor input surface may be approximately 142 millimeters wide. Although the sensor input surface 350 is shown as being circular in FIG. 3, various other shapes may also be used for the sensor input surface. In addition, the sensor input surface may be incorporated onto non-flat surfaces of the housing.

In some instances the entire sensor housing 310, or a large portion of the sensor housing 310, may be penetrable by the signals transmitted and received by the internal sensor components, thereby allowing a large portion or the entire sensor housing 310 to function as a sensor input surface. Although the sensor input surface 350 is shown as being only a portion of the side wall 305, in some instances the entire side wall 305 may be constructed as a sensor input surface. Further, multiple sensor input surfaces may be positioned on the sensor housing 310. The sensor input surface 350 may be composed of the same, or different, material as the sensor housing 310.

The sensor 300 and/or sensor housing 310 may be attached to a motor via a sensor shaft. For instance, as further shown in FIG. 3, the sensor shaft 330 may include a first end 332 and a second end 334. The first end 332 of the of the sensor shaft 330 may be attached to a motor 320 and the second end 334 of the sensor shaft may be connected to the sensor 300 and/or sensor cover 315, such as at the base portion 306 of the sensor cover. In this regard, the first end of the sensor shaft 332 may be attached to the motor 320 via a belt, gear, chain, friction roller, etc. The motor 320 may rotate the sensor shaft 330 in the first direction 335 causing the entire sensor 300 and/or sensor housing 310 to also rotate in the first direction 335. In some embodiments the sensor shaft 330 may only rotate the sensor housing 310, and not the internal sensor components 360 of the sensor.

As another alternative, the internal sensor components and the sensor housing may be configured to rotate independently of one another. In this regard, all or a portion of the sensor housing 310 may be transparent (or transparent at least in the wavelengths of the signals to be processed by the sensor 300) in order to enable signals to pass through the sensor housing and to reach the internal sensor components 360. In addition, to enable independent rotation, a first motor may be configured to rotate the sensor housing 310 and a second motor may be configured to rotate the internal sensor components. In this example, the sensor housing may be rotated to enable cleaning while the internal sensor components may still function to capture signals and generate sensor data.

The sensor 300, sensor housing 310, and/or motor 320 may each be located internally or externally from a vehicle. Although FIG. 3 shows the sensor 300 being attached to the motor 320 via a shaft 330, the motor 320 may be integrated or otherwise directly connected to the sensor 300 and/or sensor housing 310.

The internal sensor components 360 may transmit and receive one or more signals through the sensor input surface. In this regard, the internal sensor components may include one or more imaging sensors such as LIDAR, radar, sonar, camera, or other such imaging sensors positioned within the sensor housing of the sensor. The sensor input surface may be a lens, mirror or other surface by which the signals can pass or are directed to other sensor components (e.g. a photodetector in the case of a camera) in order to generate sensor data.

Figure 4:
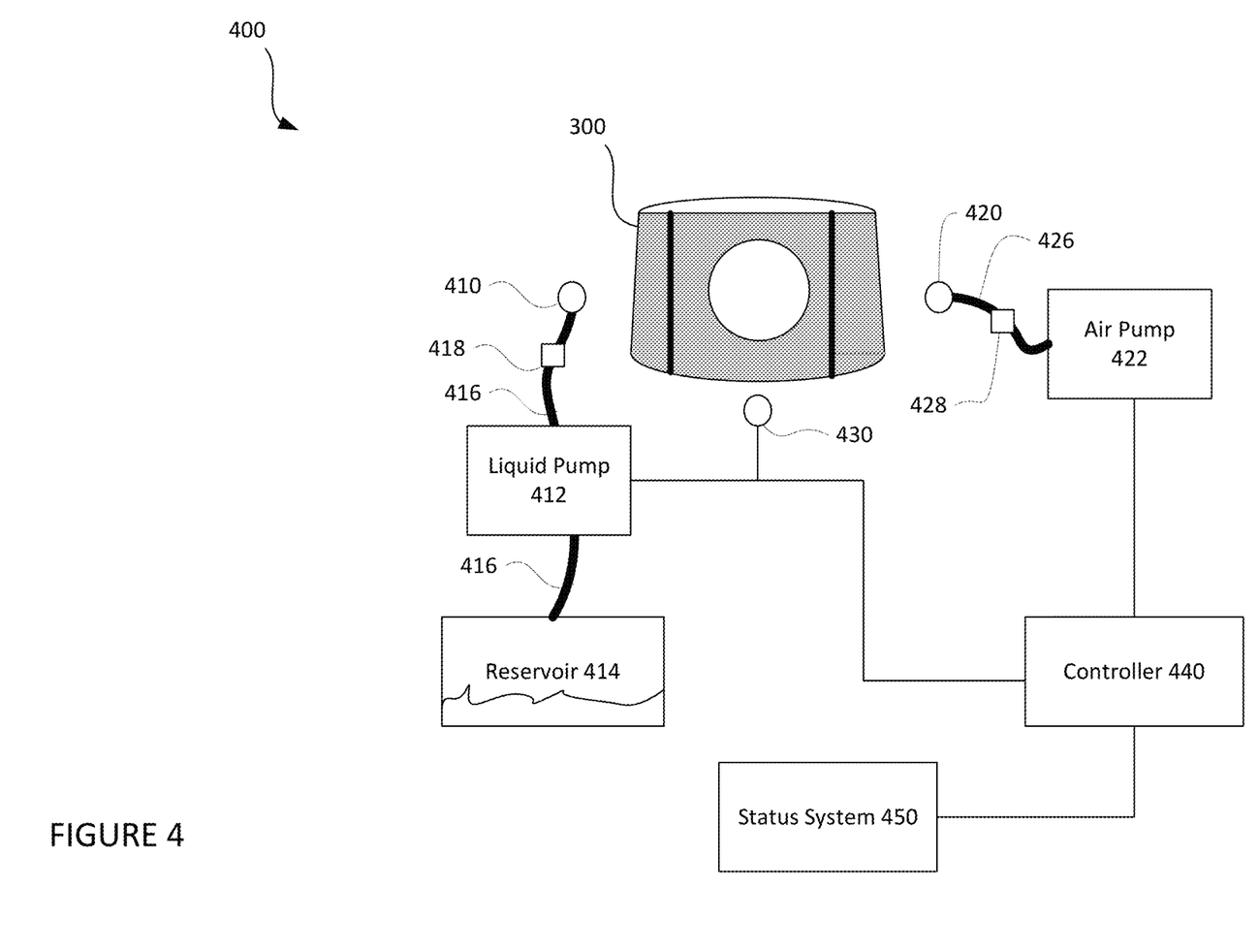
FIG. 4 is an example functional diagram of a cleaning system in accordance with aspects of the disclosure.

Turning to FIG. 4, In order to clean the sensor input surface, a cleaning system 400 may include a liquid nozzle 410 as well as an air nozzle 420. The liquid nozzle 410 may be connected to a reservoir 414 storing liquid cleaning fluid, such as water, alcohol, or various other liquid cleaning fluids. Although depicted and described as a single nozzle, liquid nozzle 410 may actually represent two or more smaller nozzles directly adjacent to one another in order to provide a more directed stream of liquid cleaning fluid. A liquid pump 412 may be configured to pump liquid cleaning fluid from the reservoir through a liquid valve 418, tubing 416, and out of the liquid nozzle 410 in order to clean the sensor input surface. The tubing may be formed from any suitable materials such as plastic, silicone, metal, etc.

Figure 5:
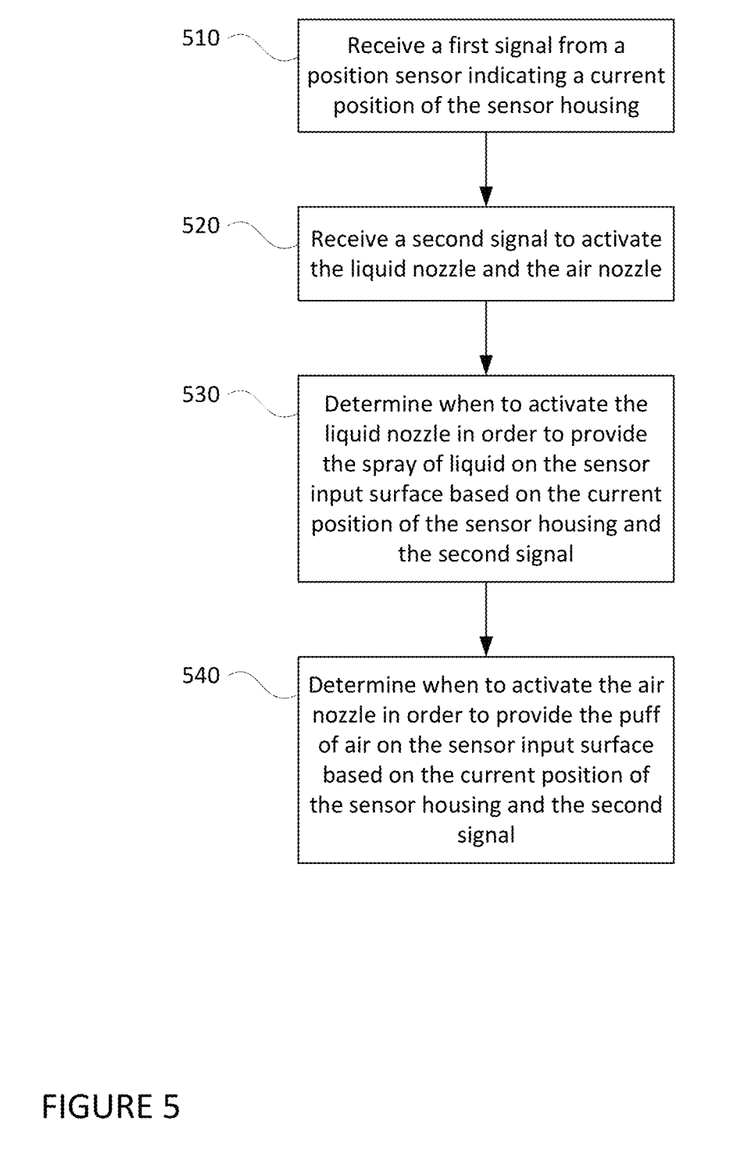
FIG. 5 is an example flow diagram in accordance with aspects of the disclosure.

As one example, if the forward direction of the vehicle (depicted in FIG. 2) is 0 degrees, and the sensor housing rotates in a clockwise direction, the liquid nozzle may be located at approximately 146 degrees as shown in FIG. 5. The rotation of the sensor housing may help to clear the liquid cleaning fluid from the sensor input surface.

However, the rotation may not be enough to ensure that the liquid cleaning fluid is fully removed from the sensor input surface. As such, the air nozzle 420 may generate a puff of liquid, such as air or another gas, in order to force the liquid cleaning fluid off of the sensor input surface. An air pump 422 may be configured to pump air through an air valve 428 out and tubing 426, and out of the air nozzle in order to clean the sensor input surface. The tubing may be formed from any suitable materials such as plastic, silicone, metal, etc.

In the example above where the forward direction of the vehicle is 0 degree, and the sensor housing rotates in a clockwise direction, the liquid nozzle may be located at approximately 236 degrees. While the exact locations may not be critical to cleaning, as noted below, the nozzles may be located closer to the rear of the vehicle than the front of the vehicle (depicted in FIG. 2), and in addition, for effective cleaning, the nozzles should be located at least half the maximum width of the spray from the nozzle or more or less apart. Using the example of a sensor housing that is approximately 277 millimeters in diameter and a sensor window that is approximately 142 millimeters wide, the angular distance between the nozzles relative to the sensor housing may be at least 80 degrees or more or less as shown in FIG. 5.

A position sensor 430 may be arranged to detect the current angular position of the sensor and/or sensor housing relative to the vehicle 100. The position sensor may include any rotational position sensor, such as a Hall effect array or an encoder, that can be used to track the position of the motor 320, sensor housing 310, and/or the internal sensor components 360. In this regard, one or more processors, such as the one or more processors 120 or other similarly configured processors, may control the motor 320 based on feedback from the position sensor or another position sensor. In this regard, the position sensor may be configured to generate a signal indicating or identifying a location of one or more of the motor, housing, or the internal sensor components. The position sensor may be located at forward direction or position with respect to the vehicle (e.g. approximately 0 degrees), such that the position sensor detects each time a center of the sensor input surface rotates passes the position sensor.

A controller 440 may include one or more computing devices having one or more processors and memory, configured the same or similarly to the computing devices 110, processors 120, and memory 130. The controller may be configured to receive, and act upon, various signals. For example, the controller may be configured to receive feedback from the position sensor indicating the position of the sensor. From this information as well as the rotation speed of the sensor housing (for example, 10 Hz or more or less), the controller may determine the current position, for example the current angular position, of the sensor input surface 350 at any given point in time.

The controller 440 may also receive signals from the sensor 300 and/or other computing devices of the vehicle indicating the current state of the sensor. For example, the controller 440 may receive a signal indicating that the sensor input surface 350 is occluded or dirty. This information may be generated by another system, for example a sensor status system 450, configured to determine whether the sensor input surface 350 is dirty. For example, this system may capture images of the sensor input surface 350 and processes these images to determine whether there is any foreign object debris located on the sensor input surface 350 and if so, approximately where.

In response, the controller 440 may use the current position of the sensor input surface 350 to determine exactly when to activate the liquid pump 412 and the air pump 422 as well as to open the air and liquid valves in order to both apply liquid cleaning fluid to the sensor input surface as well as to clear the cleaning from the sensor input surface 350 using a puff of gas such as air or other gasses. For example, by knowing the location of any given point on the sensor, the controller 440 may determine the relative position of the forward facing and rearward facing edges (relative to the direction of rotation) of the sensor input surface. In this regard, the controller is able to determine the exact location of the edges of the sensor input surface.

FIG. 5 is an example flow diagram for cleaning a sensor having a rotating sensor housing including a sensor input surface which may be performed by one or more processors of a controller such as the processors of controller 440. At block 510, a first signal from a position sensor indicating a current position of the sensor housing is received. This signal may be received from the position sensor 430 as described above.

At block 520, a second signal to activate a liquid nozzle and an air nozzle. The liquid nozzle is configured to provide a spray of liquid, and the air nozzle being configured to provide a puff of gas. For instance, the controller 440 may receive a signal from the sensor status system 450 indicating that the sensor input surface 350 requires cleaning. As noted above, the liquid nozzle 410 may provide a spray of liquid cleaning fluid to attempt to clean debris from the sensor input surface 350, and the air nozzle 420 may provide a puff of gas to remove liquid cleaning fluid and/or debris from the sensor input surface.

At block 530, when to activate the liquid nozzle in order to provide the spray of liquid on the sensor input surface is determined based on the current position of the sensor housing and the second signal. For example, the timing of the activation of the liquid pump 412 and the opening of the liquid valve 418 may be determined in order that the spray of liquid cleaning fluid from the liquid nozzle 410 is made as the sensor input surface 350 rotates passed the liquid nozzle in order to cause the liquid cleaning fluid to contact the sensor input surface without wasting the liquid cleaning fluid (i.e. rather than spraying on other portions of the sensor housing than the sensor input surface).

At block 540, when to activate the air nozzle in order to provide the puff of gas on the sensor input surface based on the current position of the sensor housing and the second signal. For example, the timing of the activation of the air pump 422 and the opening of the air valve 428 may be determined in order that the puff of gas from the air nozzle 420 is made as the sensor input surface 350 rotates passed the air nozzle in order to cause the puff of gas to contact the sensor input surface (i.e. rather than puffing on other portions of the sensor housing than the sensor input surface).

The liquid nozzle may then be activated based on the determination of when to activate the liquid nozzle. In addition, the air nozzle may be based on the determination of when to activate the air nozzle. For example, the liquid valve 418, air valve 428, liquid pump 412, and air pump 422 may be activated in order to cause a spray of liquid cleaning fluid to contact the sensor input surface 350 as the sensor input surface rotates passed the liquid nozzle 410 and to cause a puff of gas to contact the sensor input surface as the sensor input surface rotates passed the air nozzle 420.

Figure 6:
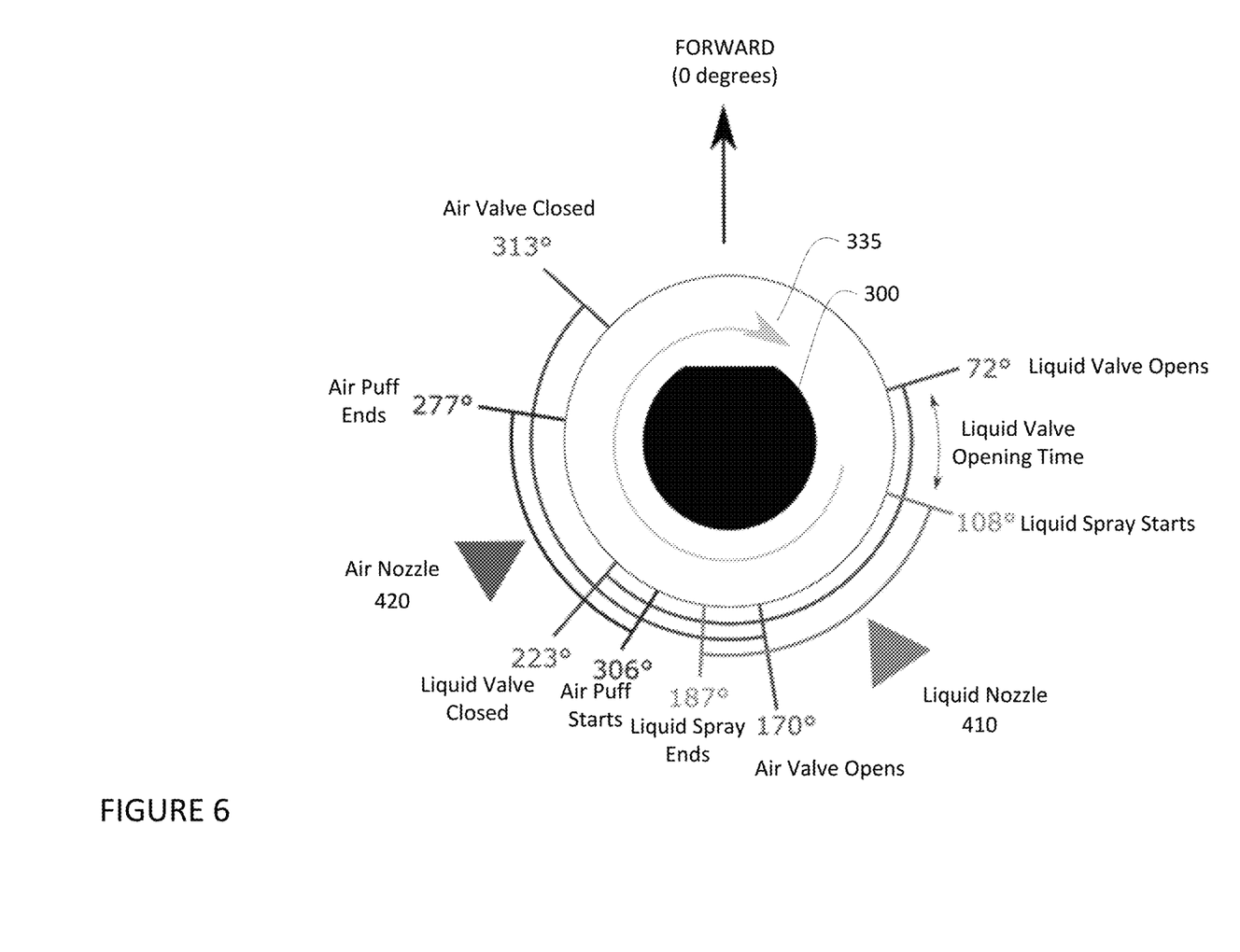
FIG. 6 is an example timing diagram in accordance with aspects of the disclosure.

FIG. 6 provides an example timing diagram for activation of the liquid nozzle 410 and air nozzle 420. In this example, the forward direction of the vehicle is designated as 0 degrees, and degrees represented in the diagram represent the different positions of the sensor input surface 350 as it rotates with the sensor 300 in the first direction 335.

When the sensor input surface 350 is located at 72 degrees, the controller 440 may open the liquid valve 418. The liquid pump 412 may be activated before the liquid valve is opened in order to enable pressure to build up behind the valve. The exact timing may depend upon the length and cross-sectional area of the tubing used. As an example, the controller may activate the liquid pump 412 such that the pump pressurizes the spray of liquid cleaning fluid about 0.25 to 0.5 seconds or more or less before the valves are opened. This may guarantee that the liquid nozzle reaches full pressurization before the cleaning begins. In addition, the timing of the opening of the liquid valve may also account for the distance and speed at which the liquid cleaning fluid will travel from the nozzle to the sensor input surface or rather, the time delay between liquid cleaning fluid leaving the nozzle and impacting the sensor input surface of the sensor. The liquid pump 412 may remain on as needed for the spray of liquid cleaning solution to be completed.

As such, as soon as the liquid valve 418 is open, the spray of liquid cleaning fluid may begin. This opening may take time, and thus, the liquid valve 418 may not be fully open until the sensor input surface 350 reaches 108 degrees. However, at least some fluid may be coming out of the liquid valve 418 as soon as it begins to open. As the liquid valve opens, the pressure in the line before the liquid valve may drop and the liquid cleaning fluid may start flowing out of the liquid valve towards the liquid nozzle. The liquid cleaning fluid may come out of the liquid nozzle but because it is a small orifice, pressure may start building inside the tube again. After a couple of milliseconds, the pressure inside the tubing may be equalized, and the spray of liquid cleaning fluid out the liquid nozzle will be fully established. In this regard, the timing of the spray of liquid cleaning solution may account for the time for the liquid valve to open as well as the time it takes to build full pressure behind the liquid nozzle due to the characteristics of the tubing such as the length and volume between the liquid valve and the liquid nozzle. The spray of liquid cleaning fluid may last as the sensor input surface rotates 350 between 108 and 187 degrees. In the systems described herein, this may cause the spray of liquid cleaning fluid to contact the sensor input surface as it rotates past the liquid nozzle. The liquid valve 418 may remain open until the sensor input surface 350 reaches 223 degrees.

When the sensor input surface 350 is located at 170 degrees, the controller 440 may cause the air valve 418 to open. As with the liquid pump 412, the air pump 422 may be activated before the air valve is opened in order to enable pressure to build up behind the air valve. The exact timing may depend upon the length and cross-sectional area of the tubing used. As an example, the controller may activate the air pump 422 such that the pump pressurizes the puff of gas about 0.25 to 0.5 seconds or more or less before the air valve is opened. This may guarantee that the air nozzle reaches full pressurization before the puff of gas begins. In addition, the timing of the opening of the air valve may also account for the distance and speed at which the puff of gas has to travel from the nozzle to the sensor input surface or rather, the time delay between the puff of gas leaving the nozzle and impacting the sensor input surface of the sensor. The air pump 422 may remain on as needed in order to complete the puff of gas.

Again, opening the valve may take time, and thus, the air valve 428 may not be fully open until the sensor input surface 350 reaches 206 degrees. At this point, the air nozzle may begin to provide a puff of gas. The puff of gas may last as the sensor input surface 350 rotates between 206 and 277 degrees. In the systems described herein, this may cause the puff of gas to contact the sensor input surface 350 as it rotates past the air nozzle. The air valve 428 may remain open until the sensor input surface reaches 313 degrees.

In some instances, the controller may be configured to clean specific portions of the sensor input surface 350. For example, the controller may clean the entire sensor input surface 350, or only a portion of the sensor input surface. The timing may be determined, for example, by referring to prestored information, such as a table or other data configuration. The figure below provides an example timing diagram based on the position of the center of the sensor input surface 350. This figure demonstrates when the liquid valve 418 is opened and closed, liquid cleaning fluid is sprayed through the liquid nozzle 410, the air valve 428 is opened and closed, and air is puffed through the air nozzle 420 when cleaning the entire sensor input surface 350.

This timing may be adjusted in order to clean different portions of the sensor input surface 350. For example, when cleaning only the first third or half (or other portion) of the sensor input surface 350 (e.g. the part that rotates past the liquid and air nozzles first), the timing of opening the liquid and air valves and starting the spray of liquid cleaning fluid and puff of gas may begin as shown in FIG. 6. However, the ending of the spray of liquid cleaning fluid and puff of gas as well as the timing of the closing of the valves may occur earlier. Similarly, when cleaning only last third or half (or other portion) of the sensor input surface 350 (e.g. the part that rotates past the nozzles last), the timing of opening the valves and starting the spray of liquid cleaning fluid and puff of gas may begin later than shown in the figure. However, the beginning of the spray of liquid cleaning fluid and puff of gas as well as the timing of opening the valves may occur later.

Once the liquid and air valves 418, 428, respectively, are opened, there may be a delay from when the pressure from the liquid and air nozzles is built up enough to hit the correct portion of the sensor input surface 350. In this regard, the timing of when the liquid valve 418 is opened and closed, liquid cleaning fluid is sprayed through the liquid nozzle 410, the air valve 428 is opened and closed, and puff of gas is puffed through the air nozzle 420 when cleaning the entire sensor input surface 350 may need to be adjusted depending upon the exact configuration of the cleaning system (e.g. how long the tubing is between the pumps and the valves and between the valves and the nozzles).

In some instances, the puff of gas may be generated during the same or a different rotation as the spray of liquid cleaning fluid. For instance, if the foreign object debris requires the liquid cleaning fluid to sit on the sensor input surface 350 for some period of time, the controller may delay the puff of gas for some number of rotations. This may be especially useful for cleaning organic materials from the sensor input surface 350 where the chemical action of the liquid cleaning fluid with the organic material is important. As an example 5-10 sprays of liquid cleaning fluid with a 1-2 second rest period might be used for bad organic fouling. The negative of this is interference with the sensor performance. Information about the type of debris and/or number of rotations may be received from the other system configured to determine whether the sensor input surface 350 is dirty.

As noted above and shown in FIG. 6, the nozzles may be positioned between the sensor housing and the rear of the vehicle. By positioning the liquid and air nozzles towards the rear of the vehicle (rather than the front), any liquid which is sprayed at the sensor housing and "misses" the sensor input surface 350 is located behind the vehicle, and therefore much less likely to be blown onto another sensor housing or some other portion of the vehicle. Moreover, this reduces the impact of the cleaning on the sensor data captured for the front of the vehicle where detecting objects may be most critical (e.g. emergency and other vehicles and other road users with which the vehicle could potentially collide are more likely to be located in front of the vehicle than behind).

The features described herein may provide for a useful and practical approach to cleaning rotating sensors. In addition, the aforementioned timing, cleaning of different portions of the sensor input surface 350 depending on where the sensor input surface is dirty, and the positioning of the nozzles may significantly reduce the amount of liquid cleaning fluid that would be wasted, for instance due to overspray, without such features. In addition, by reducing overspray, this avoids spraying onto other nearby vehicles or persons (especially in urban areas) and also reduces operational costs (as less fluid is wasted, less fluid may be needed). All of these can be important considerations when a vehicle is driving through an area where frequent cleaning is required as the amount of liquid cleaning fluid is limited to that which is in the reservoir.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for cleaning a sensor, the sensor including a rotating sensor housing with a sensor input surface, the system comprising:
a liquid nozzle configured to provide a spray of liquid;
an air nozzle configured to provide a puff of gas; and
one or more processors configured to:
receive a first signal from a position sensor indicating a current position of the rotating sensor housing;
receive a second signal to activate the liquid nozzle and the air nozzle to clean only a sub-portion of the sensor input surface;
determine when to activate the liquid nozzle in order to provide the spray of liquid on the sub-portion of the sensor input surface based on the current position of the rotating sensor housing and the second signal; and
determine when to activate the air nozzle in order to provide the puff of gas on the sensor input surface based on the current position of the rotating sensor housing and the second signal.

2. The system of claim 1, wherein the sensor is mounted on a vehicle.

3. The system of claim 2, wherein the liquid nozzle and the air nozzle are positioned between the rotating sensor housing and a rear of the vehicle.

4. The system of claim 1, wherein the second signal further indicates a number of rotations of the rotating sensor housing between when the liquid nozzle is to be activated and when the air nozzle is to be activated.

5. The system of claim 1, wherein determining when to activate the air nozzle is further in order to provide the puff of gas on the sub-portion of the sensor input surface.

6. The system of claim 1, wherein the one or more processors are further configured to:
activate the liquid nozzle further based on the determination of when to activate the liquid nozzle; and
activate the air nozzle further based on the determination of when to activate the air nozzle.

7. The system of claim 1, further comprising memory storing a table, and wherein the one or more processors are further configured to determine when to activate the liquid nozzle using the table.

8. The system of claim 7, wherein the table identifies different timing combinations for activating the liquid nozzle and the air nozzle based on different sub portions of the sensor input surface to be cleaned.

9. The system of claim 1, wherein the one or more processors are further configured to:
determine the current position of the sensor housing based on a rotational speed of the rotating sensor housing, and wherein determining when to activate the liquid nozzle is further based on a timing such that the spray of liquid is applied to the sub-portion as the rotating sensor housing rotates about an axis.

10. The system of claim 9, wherein determining when to activate the air nozzle is further based one or more of an amount of time to build pressure behind the liquid nozzle, a distance at which the spray of liquid is to travel from the liquid nozzle to the sensor input surface, or a speed at which the spray of liquid is to travel from the liquid nozzle to the sensor input surface.

11. The system of claim 1, wherein the one or more processors are further configured to:
determine the current position of the sensor housing based on a rotational speed of the rotating sensor housing, and wherein determining when to activate the air nozzle is further based on a timing such that the puff of gas is applied to the sensor input surface as the rotating sensor housing rotates about an axis.

12. The system of claim 1, wherein the liquid nozzle is one among a plurality of liquid nozzles arranged adjacently and configured to provide the spray of liquid.

13. The system of claim 1, wherein the air nozzle is configured to provide the puff of gas to remove the spray of liquid from the sensor input surface after the spray of liquid has been applied to the sensor input surface.

14. The system of claim 1, wherein the second signal is based on sensor status information generated by a sensor status system.

15. The system of claim 14, wherein the sensor status information is based on captured images of the sensor input surface.

16. The system of claim 1, wherein the spray of liquid comprises a liquid cleaning fluid.

17. The system of claim 16, wherein the liquid cleaning fluid includes at least one of water or alcohol.

18. The system of claim 1, wherein the rotating sensor housing is configured to rotatable independently from internal sensor components contained within the rotating sensor housing.

19. The system of claim 18, further comprising a first motor configured to rotate the rotating sensor housing and a second motor configured to rotate the internal sensor components.

20. The system of claim 1, wherein the one or more processors are further configured to:
determine to activate the air nozzle after a number of rotations of the rotating sensor housing.

\* \* \* \* \*